(12) United States Patent
Takai et al.

(10) Patent No.: US 9,261,086 B2
(45) Date of Patent: Feb. 16, 2016

(54) FLUID DISTRIBUTION VALVE, FLUID SUPPLY SYSTEM COMPRISING SAME, AND METHOD FOR CONTROLLING THE FLUID SUPPLY SYSTEM

(75) Inventors: Motoharu Takai, Fujisawa (JP); Mitsuyuki Wakabayashi, Yokosuka (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 399 days.

(21) Appl. No.: 13/877,849

(22) PCT Filed: Oct. 5, 2010

(86) PCT No.: PCT/JP2010/005953
§ 371 (c)(1),
(2), (4) Date: Apr. 16, 2013

(87) PCT Pub. No.: WO2012/046264
PCT Pub. Date: Apr. 12, 2012

(65) Prior Publication Data
US 2014/0166109 A1    Jun. 19, 2014

(51) Int. Cl.
*F04B 23/00* (2006.01)
*B60S 1/48* (2006.01)
*B60S 1/58* (2006.01)
(Continued)

(52) U.S. Cl.
CPC ............... *F04B 23/00* (2013.01); *B60S 1/481* (2013.01); *F04D 5/002* (2013.01); *F04D 15/0016* (2013.01); *F16K 11/02* (2013.01); *F16K 11/044* (2013.01); *F16K 17/0473* (2013.01);
(Continued)

(58) Field of Classification Search
CPC .......... B60S 1/48; B60S 1/606; F16K 11/022; F04B 49/08; F04B 53/106; F04B 53/1067
USPC .......... 239/284.1, 284.2; 137/625.11, 118.06, 137/119.03, 119.06, 119.08, 565.13; 415/152.1, 146, 911; 417/315, 442, 417/446–447
See application file for complete search history.

(56) References Cited

U.S. PATENT DOCUMENTS

| | | | | |
|---|---|---|---|---|
| 2,634,166 A | * | 4/1953 | Sacchini | B60S 1/48 15/250.01 |
| 2,926,693 A | * | 3/1960 | Ziegler | B60S 1/48 137/512.4 |

(Continued)

FOREIGN PATENT DOCUMENTS

| | | | | |
|---|---|---|---|---|
| DE | 3831380 A1 | * | 4/1989 | ............. B05B 1/304 |
| JP | 2000-145986 | * | 5/2000 | |

(Continued)

*Primary Examiner* — Alexander Comley
(74) *Attorney, Agent, or Firm* — Manabu Kanesaka

(57) ABSTRACT

A fluid distribution valve which selectively distributes a fluid supplied from a fluid supply source to a plurality of flow channels, includes first and second branch pipes communicated with the fluid supply source; and a valve body selectively closing either one of the two branch pipes, and including a through hole allowing a circulation of the fluid into the second branch pipe from the fluid supply source in a case wherein the first branch pipe is closed. While the valve body closes the first branch pipe in an initial state thereof, the valve body is displaced or deformed according to a pressure difference of the fluid in the a first branch pipe side and the a second branch pipe side when the fluid is supplied from the fluid supply source so as to open the first branch pipe, and to close the through hole.

5 Claims, 12 Drawing Sheets

(51) Int. Cl.
*F04D 15/00* (2006.01)
*F16K 11/044* (2006.01)
*F16K 17/04* (2006.01)
*F04D 5/00* (2006.01)
*F16K 11/02* (2006.01)

(52) U.S. Cl.
CPC .... *Y10T137/0318* (2015.04); *Y10T 137/85986* (2015.04); *Y10T 137/86501* (2015.04)

(56) References Cited

U.S. PATENT DOCUMENTS

| | | | | |
|---|---|---|---|---|
| 3,150,856 | A * | 9/1964 | Deibel | B60S 1/48 137/596.2 |
| 3,286,932 | A * | 11/1966 | Kibler | B60S 1/482 222/394 |
| 3,633,827 | A * | 1/1972 | Novak | B60S 1/50 15/250.02 |
| 3,759,290 | A * | 9/1973 | D'Alba | B60S 1/48 137/565.17 |
| 3,902,217 | A * | 9/1975 | Botz | B60S 1/606 15/250.002 |
| 4,360,158 | A * | 11/1982 | Bauer | B60S 1/48 239/284.1 |
| 4,600,361 | A * | 7/1986 | Bianco | B60S 1/481 415/146 |
| 4,679,983 | A * | 7/1987 | Pietryk | B60S 1/481 137/625.46 |
| 4,728,260 | A * | 3/1988 | Ishii | B60S 1/481 137/118.06 |
| 4,824,332 | A * | 4/1989 | Perkins | F04D 15/0016 415/146 |
| 4,838,488 | A * | 6/1989 | Heier | B60S 1/481 137/594 |
| 4,874,298 | A * | 10/1989 | Mainardi | B60S 1/481 415/148 |
| 4,900,235 | A * | 2/1990 | Perkins | F04D 15/0016 415/146 |
| 4,919,591 | A * | 4/1990 | Kamimura | B60S 1/481 415/152.1 |
| 5,071,315 | A * | 12/1991 | Kiyama | B60S 1/481 415/144 |
| 5,186,606 | A * | 2/1993 | Egner-Walter | B60S 1/481 415/152.1 |
| 5,344,293 | A * | 9/1994 | Mota | B60S 1/481 137/119.03 |
| 5,934,872 | A * | 8/1999 | Yamauchi | B60S 1/481 415/146 |
| 5,984,644 | A * | 11/1999 | Yu | F04D 15/0016 417/280 |
| 6,461,121 | B1 * | 10/2002 | Lelong | B60S 1/481 239/284.1 |
| 6,491,503 | B2 * | 12/2002 | Hoffmann | F04D 29/426 239/284.1 |
| 6,896,199 | B2 * | 5/2005 | Bissonnette | B60S 1/481 239/128 |
| 6,951,223 | B2 * | 10/2005 | Fukushima | B60S 1/481 134/186 |
| 2004/0188541 | A1* | 9/2004 | Maruyama | B60S 1/481 239/284.1 |

FOREIGN PATENT DOCUMENTS

| | | |
|---|---|---|
| JP | 2000-145986 A | 5/2000 |
| JP | 2004-224214 | 8/2004 |

* cited by examiner

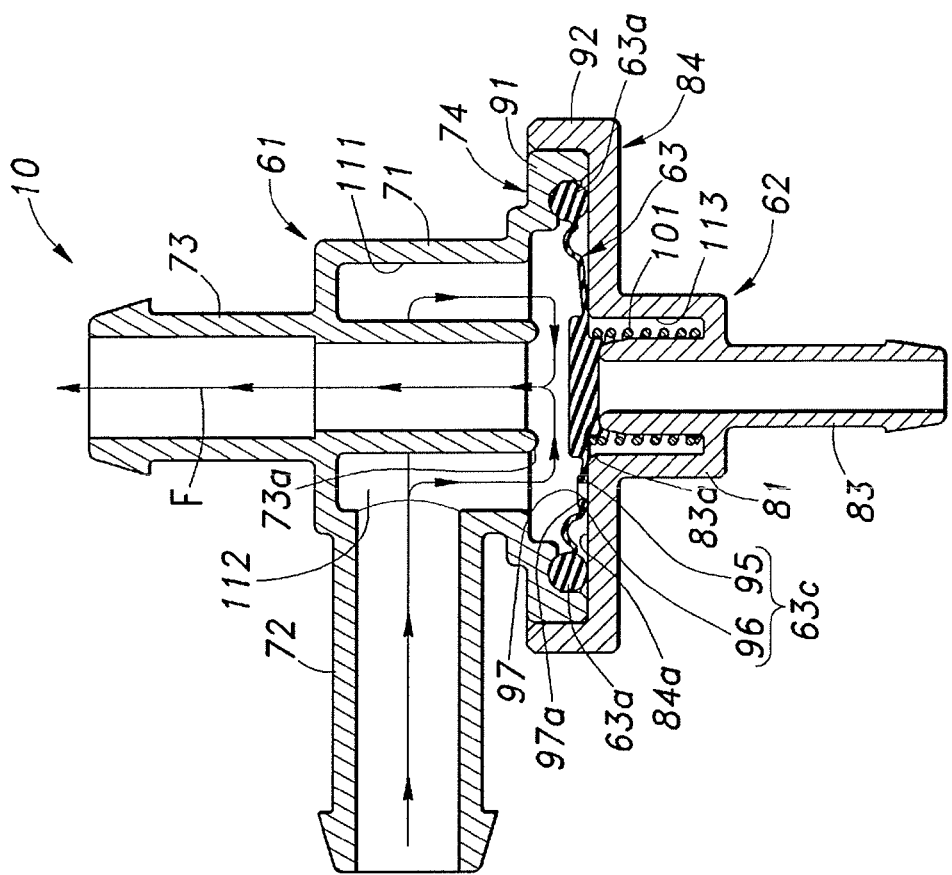
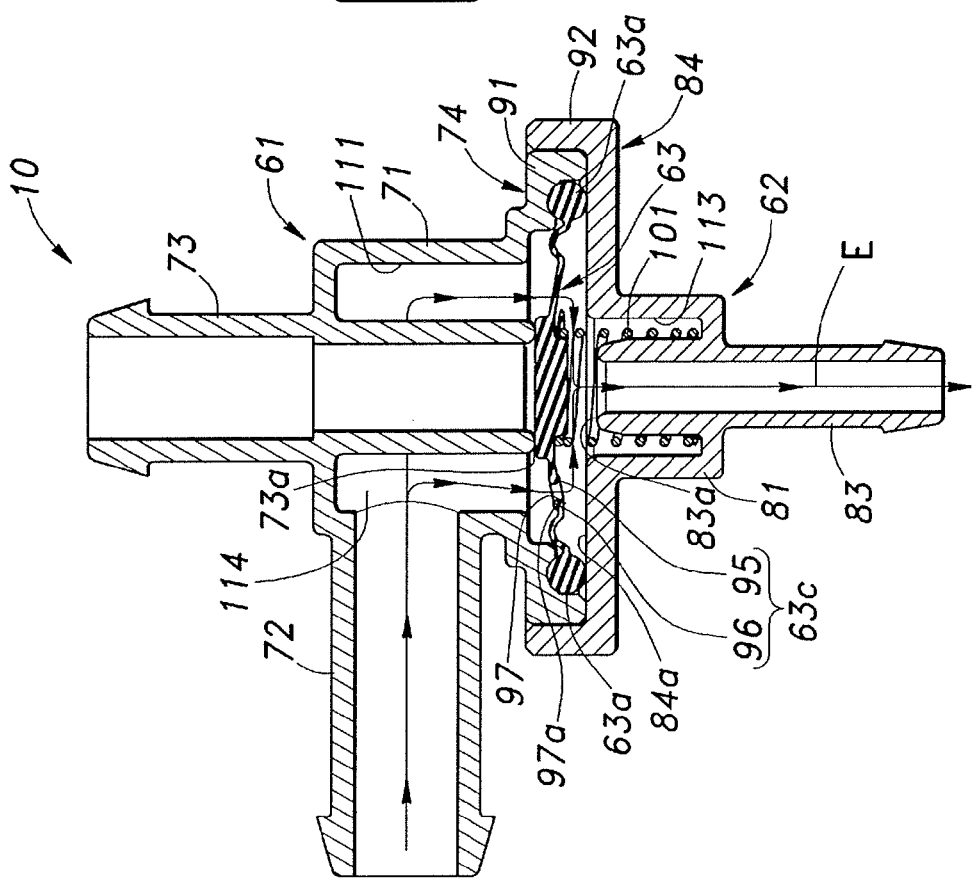

FLUID DISTRIBUTION VALVE, FLUID SUPPLY SYSTEM COMPRISING SAME, AND METHOD FOR CONTROLLING THE FLUID SUPPLY SYSTEM

RELATED APPLICATIONS

The present application is National Phase of International Application No. PCT/JP2010/005953 filed Oct. 5, 2010.

FIELD OF TECHNOLOGY

The present invention relates to a fluid distribution valve which selectively supplies a fluid supplied from a fluid supply source to a plurality of flow channels; a fluid supply system comprising the same; and a method for controlling the fluid supply system. Especially, the present invention relates to the fluid distribution valve preferred for a usage for a washer pump used for cleaning a window and the like of an automobile; the fluid supply system comprising the same; and the method for controlling the fluid supply system.

BACKGROUND ART

Conventionally, there exists a washer pump system mounted on the automobile, and selectively supplying a washer fluid inside a washer tank to either a front window or a rear window.

As this kind of washer pump system, for example, there is known, for example, a washer pump system comprising a pump device including two discharge openings discharging the washer fluid with a discharge pressure in which a magnitude relation reverses according to a rotational direction of an impeller; and a valve mechanism including two derivation flow channels respectively communicated with each discharge opening, and operating by a pressure difference of the discharge pressure so as to close the derivation flow channel having a lower pressure, and also to open the derivation flow channel having a higher pressure among the two derivation flow channels (for example, see Patent Document 1).

PRIOR ART DOCUMENT

Patent Document

Patent Document 1: Japanese Patent Application Publication No. 2004-224214

SUMMARY OF THE INVENTION

Problems to be Solved by the Invention

In the aforementioned conventional technology, only by changing the rotational direction of a pump (impeller), a supply route (toward the front window, or toward the rear window) of the washer fluid can be easily changed. However, in the aforementioned conventional technology, in a case wherein the washer fluid is attempted to be additionally supplied to another supply destination (for example, a headlamp) (i.e., a case wherein a supply of the washer fluid relative to three or more fluid supply routes is necessary), the washer fluid cannot be supplied to a plurality of fluid supply routes through one discharge opening of the pump, so that newly another washer pump had to be prepared.

The present invention is made in view of such a problem of the conventional technology, and a main object of the present invention is to provide a fluid distribution valve which can selectively supply the fluid relative to at least two or more fluid supply routes with a simplified structure without requiring a plurality of fluid supply source such as the pump device and the like; a fluid supply system comprising the same; and a method for controlling the fluid supply system.

Means for Solving the Problems

According to the first aspect of the present invention made in order to solve the aforementioned problem, the present invention is a fluid distribution valve (10) which selectively distributes a fluid supplied from fluid supply sources (5, 122, and 132) to a plurality of flow channels. The fluid distribution valve (10) comprises first and second branch pipes (73 and 83) communicated with the aforementioned fluid supply sources; and a valve body (63) selectively closing either one of the two branch pipes, and including a through hole (97) allowing a circulation of the fluid into the second branch pipe from the fluid supply sources in a case wherein the first branch pipe is closed. While the valve body closes the first branch pipe in an initial state thereof, when the fluid is supplied from the fluid supply sources, the valve body is displaced or deformed according to a pressure difference of the fluid in the first branch pipe side and the second branch pipe side so as to open the first branch pipe, and to close the through hole.

Also, according to a second aspect of the present invention, there is additionally provided an urging device (101) urging the main body portion in a direction of closing the first branch pipe.

Also, according to a third aspect of the present invention, in a case wherein the first branch pipe is in a closed state, there is additionally provided an accumulator (155) including a storage space (V1) communicated with the fluid supply sources through the through hole. The storage space is expanded by a pressure of the fluid when the fluid is supplied from the fluid supply sources.

Also, according to a fourth aspect of the present invention, the accumulator includes a cup-shaped elastic member (141) defining one portion of the storage space. The elastic member includes a bottom portion (151) having an end-rounded conical shape; and an annular opening edge portion (152) continuing into the bottom portion. In an initial state of the elastic member, the bottom portion is in a state folded back inside the opening edge portion. On the other hand, the aforementioned folded-back state is resolved by the pressure of the fluid.

Also, according to a fifth aspect of the present invention, the present invention is a fluid supply system (1) which selectively supplies the fluid to a plurality of fluid supply routes, and the fluid supply system (1) comprises a pump device (5) discharging the fluid; the fluid distribution valve (10) connected to the pump device; and a pump control device (11) controlling a discharge pressure of the pump device. The fluid distribution valve includes the first and second branch pipes (73 and 83) communicating with one flow channel of the pump device; and the valve body (63) operating according to the pressure difference of the fluid in the first branch pipe side and the second branch pipe side so as to selectively close either one of the two branch pipes.

Also, according to a sixth aspect of the present invention, with respect to the fifth aspect, the valve body includes the through hole (97) allowing the circulation of the fluid into the second branch pipe from the fluid supply sources in the case wherein the first branch pipe is closed. While the valve body closes the first branch pipe in the initial state thereof, when the fluid is supplied from the fluid supply sources, the valve body is displaced or deformed according to the pressure difference of the fluid in the first branch pipe side and the second branch pipe side so as to open the first branch pipe, and to close the through hole.

Also, according to a seventh aspect of the present invention, with respect to the sixth aspect, the pump device includes two discharge openings (3 and 4) respectively discharging the fluid with the discharge pressure in which a magnitude relation reverses according to a rotational direction of an impeller. The seventh aspect of the present invention additionally comprises a valve mechanism (8) including first and second derivation flow channels (6 and 7) respectively communicating with each discharge opening, closing the derivation flow channel on a low pressure side of the two derivation flow channels, and opening the derivation flow channel on a high pressure side of the two derivation flow channels, according to the pressure difference of the fluid discharged from each discharge opening. The fluid distribution valve is connected to the valve mechanism, and the first and second branch pipes are communicated with the first derivation flow channel.

Also, according to an eighth aspect of the present invention, the present invention is a method for controlling the fluid supply system with respect to the seventh aspect, and the pump control device has a step of controlling the rotational direction of the impeller and a rotational movement of the impeller in at least one rotational direction so as to selectively supply the fluid to either the second derivation flow channel, the first branch pipe, or the second branch pipe.

Also, according to a ninth aspect of the present invention, with respect to the eighth aspect, the pump device includes an electric motor driving the impeller to rotate, and the pump control device additionally has a fluid-pressure adjustment step controlling a rotating speed of the impeller by adjusting a drive voltage of the electric motor.

Also, according to a tenth aspect of the present invention, with respect to the ninth aspect, the pump control device adjusts the drive voltage of the electric motor by a PWM control.

Also, according to an eleventh aspect of the present invention, the present invention is the method for controlling the fluid supply system with respect to the sixth aspect. The pump control device includes the electric motor driving the pump. Also, when an electric voltage, which is applied to the electric motor, is controlled by the PWM control, and a supply of the fluid starts, the pump control device has a step of maintaining the closed state of the first branch pipe by gradually increasing a supply pressure of the fluid up to a predetermined value at a second time (T2) which is larger than a first time (T1) while opening the first branch pipe and closing the through hole by increasing the supply pressure of the fluid up to the predetermined value within the first time.

Also, according to a twelfth aspect of the present invention, the present invention is the method for controlling the fluid supply system comprising the fluid distribution valve with respect to the first aspect. The fluid supply systems (121 and 131) comprise first and second plumbing (123 and 134) provided as a branch flow channel in the flow channel connecting the fluid supply sources (122 and 132) and the fluid distribution valve (10); a throttle valve (125) provided in the first plumbing; and a flow-channel switchover valve (8) provided on an upstream side of the first and second plumbing, and selectively circulating the fluid from the fluid supply sources to the first or second plumbing. In a case wherein the fluid is circulated to the second plumbing by the flow-channel switchover valve, the fluid supply systems have a step of opening the first branch pipe, and closing the through hole. On the other hand, in a case wherein the fluid is circulated to the first plumbing by the flow-channel switchover valve, the fluid supply systems have a step of maintaining the closed state of the first branch pipe by gradually increasing the pressure of the fluid supplied to the fluid distribution valve by the throttle valve.

Effect of the Invention

According to the first aspect of the present invention, the present invention has an excellent operational effect of being capable of selectively supplying the fluid relative to two flow channels only by increasing and decreasing the pressure (i.e., the pressure difference of the fluid in the first branch pipe side and the second branch pipe side) of the fluid supplied from the fluid supply sources, without requiring a plurality of fluid supply sources such as the pump device and the like.

According to the second aspect of the present invention, in a case wherein the valve body is in the initial state, the first branch pipe can be reliably closed.

According to the third aspect of the present invention, when the first branch pipe is open, an inflow of an unintended fluid to the second branch pipe can be prevented.

According to the fourth aspect of the present invention, when the first branch pipe is open, a structure, in which the storage space expands by the pressure of the fluid, can be easily realized.

According to the fifth aspect of the present invention, in a simplified structure using one pump device, only by increasing and decreasing the pressure (i.e., the pressure difference of the fluid in the first branch pipe side and the second branch pipe side) of the fluid supplied from the fluid supply sources, the fluid can be selectively supplied relative to two flow channels.

According to the sixth aspect of the present invention, the valve body selectively closing either one of the first or second branch pipes can be realized by the simplified structure.

According to the seventh aspect and the eighth aspect of the present invention, in the simplified structure using one pump device, by controlling the rotational direction of the impeller, and the rotational movement (i.e., small and large pressures of the fluid guided to the first derivation flow channel) of the impeller in one rotational direction, the fluid can be selectively supplied relative to three fluid supply routes (the second derivation flow channel, the first branch pipe, and the second branch pipe).

According to the ninth aspect of the present invention, the pressure of the fluid guided to the first derivation flow channel can be easily adjusted (i.e., selected to close or open the first and second branch pipes).

According to the tenth aspect of the present invention, even in a case wherein a certain amount of power-supply voltage is supplied from an electric power supply, the electric voltage which is applied to the electric motor can be easily adjusted.

According to the eleventh aspect of the present invention, even in a case wherein the supply pressure of the fluid by the pump device cannot increase and decrease in a necessary range, a rise of the supply pressure of the fluid is properly controlled, so that by the simplified structure, the fluid can be selectively supplied relative to two fluid supply routes (the first and second branch pipes).

According to the twelfth aspect of the present invention, without requiring a plurality of fluid supply sources such as a faucet, a compressor, and the like, only by switching the plumbing allowing the fluid to circulate by the flow-channel switchover valve, the fluid can be selectively supplied relative to two flow channels connected to a downstream side of the fluid distribution valve.

BRIEF DESCRIPTION OF THE DRAWINGS

FIGS. 5(A) and 5(B) are cross-sectional views showing an operation of the fluid distribution valve according to the first embodiment.

BEST MODES OF CARRYING OUT THE INVENTION

First Embodiment

Hereinafter, a washer pump system as a fluid supply system comprising a fluid distribution valve according to the first embodiment of the present invention will be explained with reference to drawings. In the explanation, directional terms are indicated according to an indication of a referred drawing. However, a practical placement of each composition element is not limited to the above. Incidentally, a cross-sectional surface of a washer pump 5 and a valve mechanism 8 corresponds to a cross-sectional surface taken along a line I-I in FIG. 2.

Figure 1:
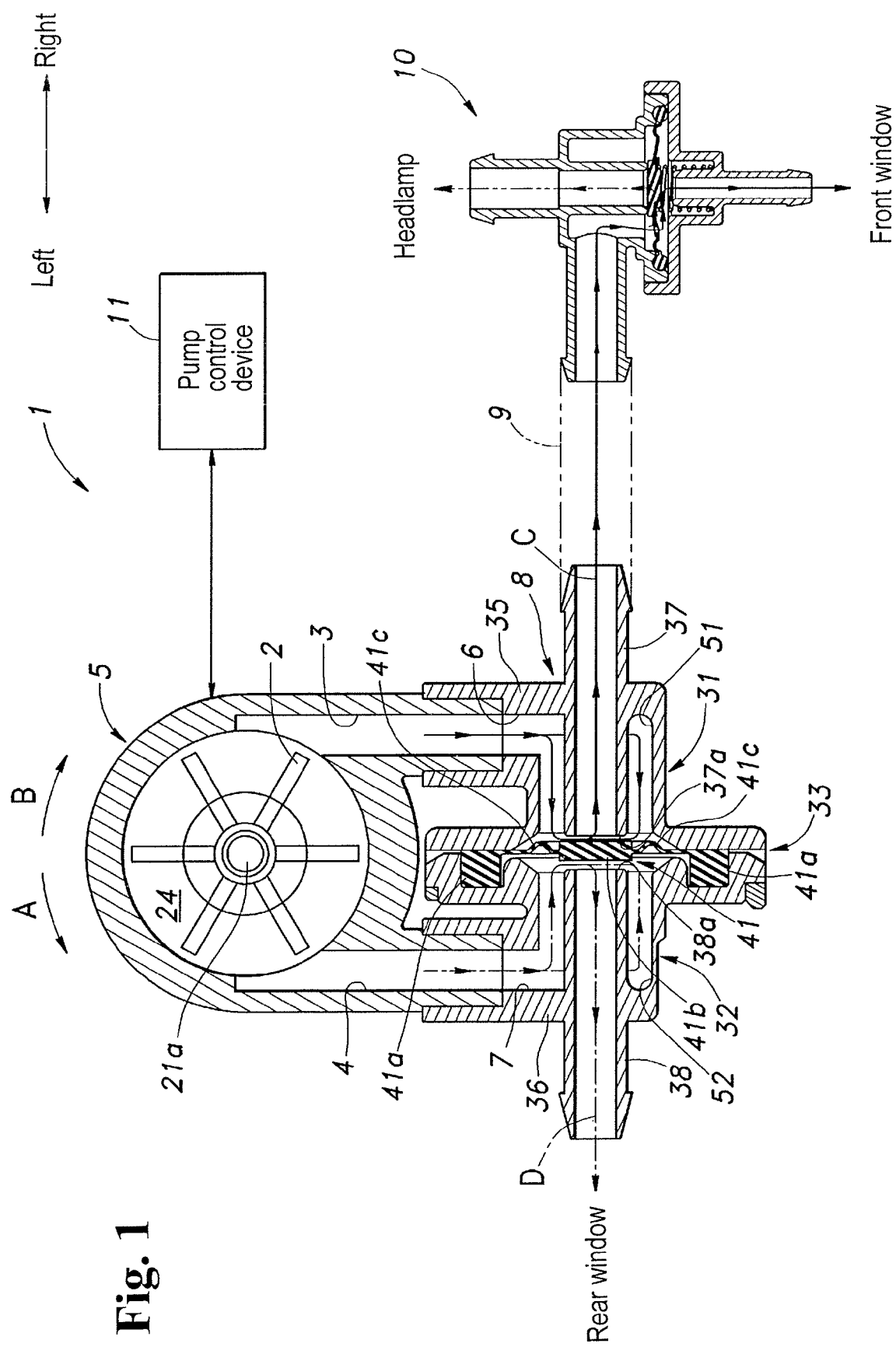
FIG. 1 is a structural view of a washer pump system comprising a fluid distribution valve according to the first embodiment.

As shown in FIG. 1, a washer pump system 1 is mounted on an automobile which is not shown in the figure, and allows to supply a washer fluid (a fluid) relative to supply routes in three directions corresponding to a front window, a rear window, and a headlamp. The washer pump system 1 mainly comprises the washer pump (a pump device) 5 including first and second discharge pipes (discharge openings) 3 and 4 respectively discharging the washer fluid with a discharge pressure in which a magnitude relation reverses according to a rotational direction of an impeller 2 which is driven to rotate; the valve mechanism 8 including first and second derivation flow channels 6 and 7 respectively communicated with each discharge pipe 3 and 4, and closing the derivation flow channel on a low pressure side of the two derivation flow channels 6 and 7, and also opening the derivation flow channel on a high pressure side of the two derivation flow channels 6 and 7, according to a pressure difference of the washer fluid discharged through each discharge pipe 3 and 4; a fluid distribution valve 10 connected to the valve mechanism 8 through plumbing 9; and a pump control device 11 controlling a rotational movement of the impeller 2.

Figure 2:
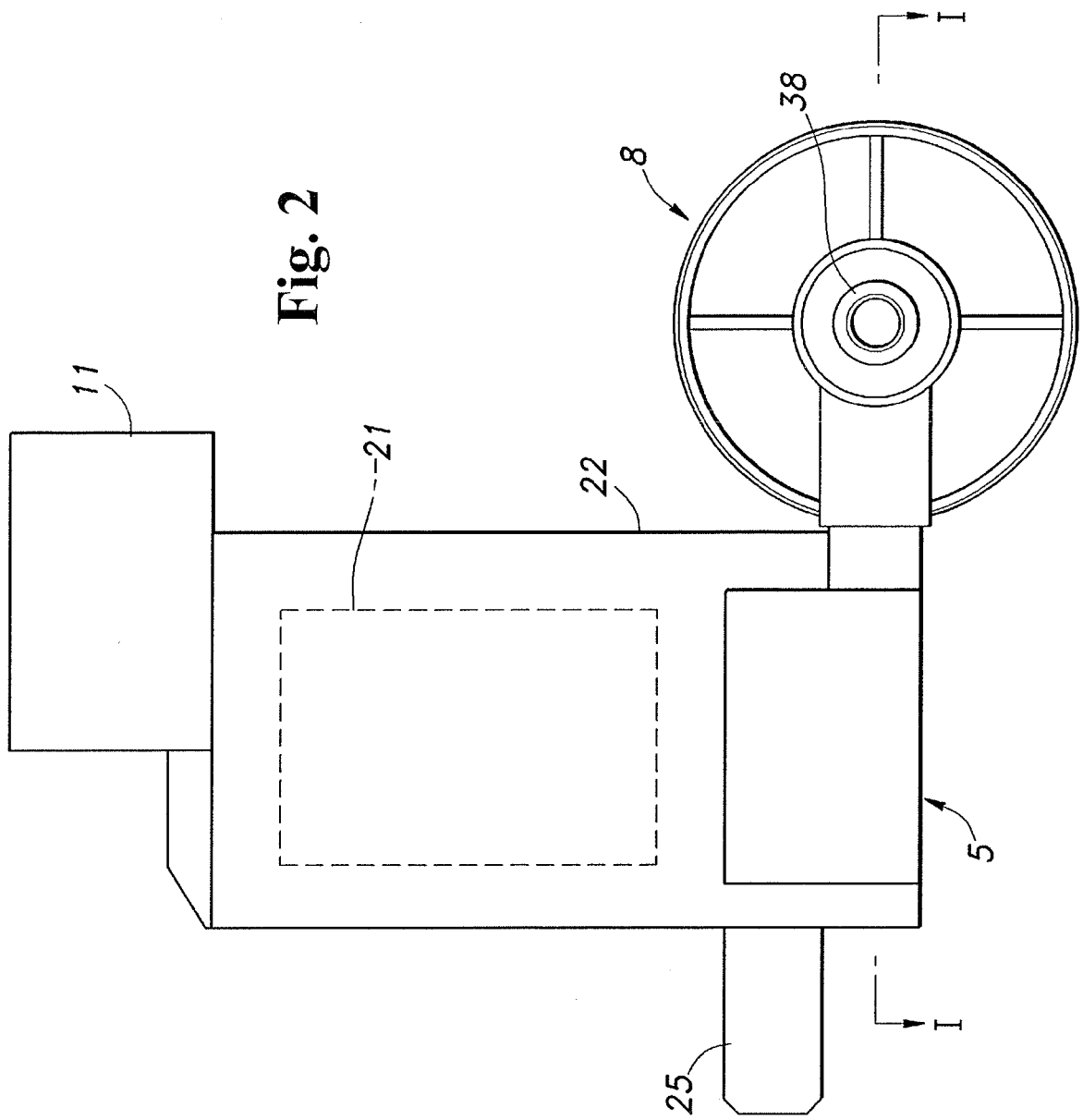
FIG. 2 is a side view of a pump device comprising a valve mechanism according to the first embodiment.

As shown in FIG. 2, the washer pump 5 includes a main body case 22 in which an electric motor 21 is housed. Inside the main body case 22, there is formed a pump chamber 24 (see FIG. 1) in which the impeller 2 attached to a rotation axis 21a (see FIG. 1) of the electric motor 21 is housed. In the pump chamber 24, there is supplied the washer fluid through a washer fluid supply pipe 25 from a washer fluid tank which is not shown in the figure. Also, the first and second discharge pipes 3 and 4 communicated with the pump chamber 24 are provided to protrude approximately symmetrically in a direction vertical to an axis of the impeller 2.

In the washer pump 5, in a case wherein the impeller 2 (i.e., the electric motor 21) carries out a normal rotation (a rotation in a counterclockwise direction shown by an arrow A in FIG. 1), a discharge pressure of the second discharge pipe 4 becomes higher than a discharge pressure of the first discharge pipe 3. On the other hand, in a case wherein the impeller 2 carries out a reverse rotation (a rotation in a clockwise direction shown by an arrow B in FIG. 1), the discharge pressure of the first discharge pipe 3 becomes higher than a pressure of the second discharge pipe 4.

As shown in FIG. 1, the valve mechanism 8 is composed by first and second split housings 31 and 32 having an approximately symmetrical shape, and includes a housing main body 33 having an approximately cylindrical shape whose both right and left ends are closed. In the housing main body 33, there are provided to protrude first and second inflow pipes 35 and 36 from a peripheral wall in a direction vertical to an axis direction thereof (a right-and-left direction in FIG. 1). The two inflow pipes 35 and 36 are respectively connected to two discharge pipes 3 and 4 of the washer pump 5. Also, in the housing main body 33, there are provided to protrude first and second outflow pipes 37 and 38 provided to extend to an outside in the axis direction in such a way as to respectively pass through right and left walls from an inside thereof.

Two split housings 31 and 32 are fitted into each other in a state wherein a film-like valve body 41 made of a rubber diaphragm is installed between the split housings 31 and 32. The film-like valve body 41 includes an annular outer circumferential portion 41a clamped between fitting portions of the split housings 31 and 32; a thick and comparatively hard disk portion 41b provided approximately in the center; and an annular flexible portion 41c having a flexibility connecting the outer circumferential portion 41*a* and the disk portion 41*b*. The flexible portion 41*c* is bent and deforms by a pressure (more precisely, the pressure difference of the washer fluid discharged from the discharge pipes 3 and 4) of the washer fluid, so that the disk portion 41*b* can be displaced in the axis direction (the right-and-left direction in FIG. 1).

There, annular end edges 37*a* and 38*a* positioned inside the first and second outflow pipes 37 and 38 respectively function as a valve seat relative to the film-like valve body 41. Namely, the disk portion 41*b* of the film-like valve body 41 is displaced in a right direction by the pressure of the washer fluid, so that a right surface thereof closely contacts with the end edge 37*a* and closes the first outflow pipe 37. On the other hand, in the film-like valve body 41, the disk portion 41*b* is displaced in a left direction, so that a left surface thereof closely contacts with the end edge 38*a* and closes the second outflow pipe 38.

In the valve mechanism 8, there are formed annular communicating channels 51 and 52 between the peripheral wall (except for the fitting portion) of the housing main body 33 and the first and second outflow pipes 37 and 38. The first and second derivation flow channels 6 and 7, which transport the washer fluid, are defined by the communicating channels 51 and 52; the first and second inflow pipes 35 and 36; and the first and second outflow pipes 37 and 38, and there generate flows respectively shown by an arrow C with a solid line and an arrow D with an alternate long and short dash line in FIG. 1. There, in the first and second derivation flow channels 6 and 7, portions, defined by the communicating channels 51 and 52, and the first and second outflow pipes 37 and 38, are separated to right and left by the film-like valve body 41. Thereby, the first and second derivation flow channels 6 and 7 are formed as mutually independent flow channels. Incidentally, in this case, an example, wherein the valve mechanism 8 is provided as a separate body from the washer pump 5, and is mutually connected to the washer pump 5, has been shown. However, one portion or all of composition elements of the valve mechanism 8 can be integrally provided with the washer pump 5.

Figure 3:
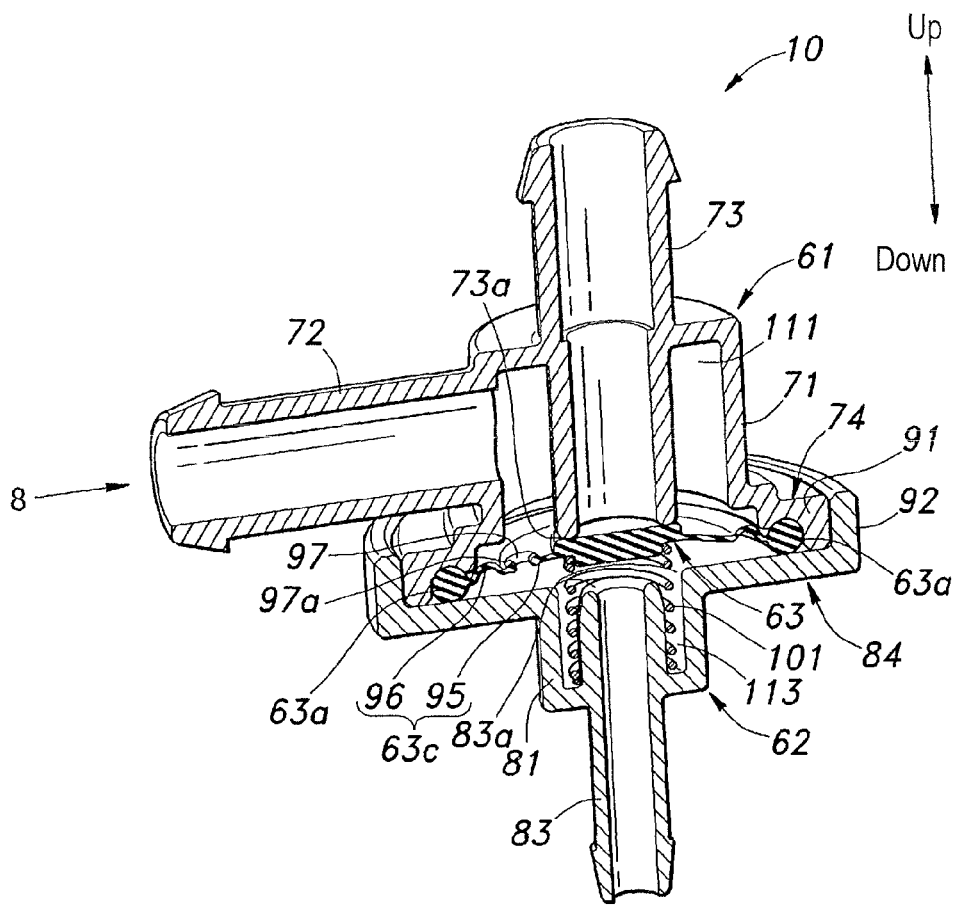
FIG. 3 is a cross-sectional perspective view of the fluid distribution valve according to the first embodiment.

As shown in FIG. 3, the fluid distribution valve 10 includes a first split housing 61; a second split housing 62 connected to one end side (in this case, a lower side) of the first split housing 61; and a film-like valve body 63 made of a rubber diaphragm and installed between the two split housings 61 and 62.

The first split housing 61 includes a main body portion 71 having a cylindrical shape with a bottom (in this case, an upper end is closed); an inflow pipe 72 provided to extend in a horizontal direction (a direction vertical to an axis direction) from a circumferential face of the main body portion 71; a first branch pipe 73 provided to extend in the axis direction in such a way as to pass through the center of an upper wall thereof from an inside of the main body portion 71; and a flange-like portion 74 formed across an entire circumference of an outer circumferential face thereof in such a way as to project to an outside in a circumferential direction from one end (in this case, a lower end) of the main body portion 71. The inflow pipe 72 is communicated with the first outflow pipe 37 of the valve mechanism 8 through the plumbing 9 (see FIG. 1).

The second split housing 62 includes a main body portion 81 having a cylindrical shape with a bottom (in this case, a lower end is closed); a second branch pipe 83 provided to extend in a vertical direction in such a way as to pass through the center of a lower wall thereof from an inside of the main body portion 81; and a flange-like portion 84 formed across an entire circumference of an outer circumferential face thereof in such a way as to project to an outside in a circumferential direction from one end (in this case, an upper end) of the main body portion 81. The main body portion 81 includes a diameter smaller than that of the main body portion 71 of the first split housing 61, and is displaced on the same axis as the main body portion 71. Also, the second branch pipe 83 includes a diameter smaller than that of the first branch pipe 73, and is displaced on the same axis as the first branch pipe 73.

Figure 4:
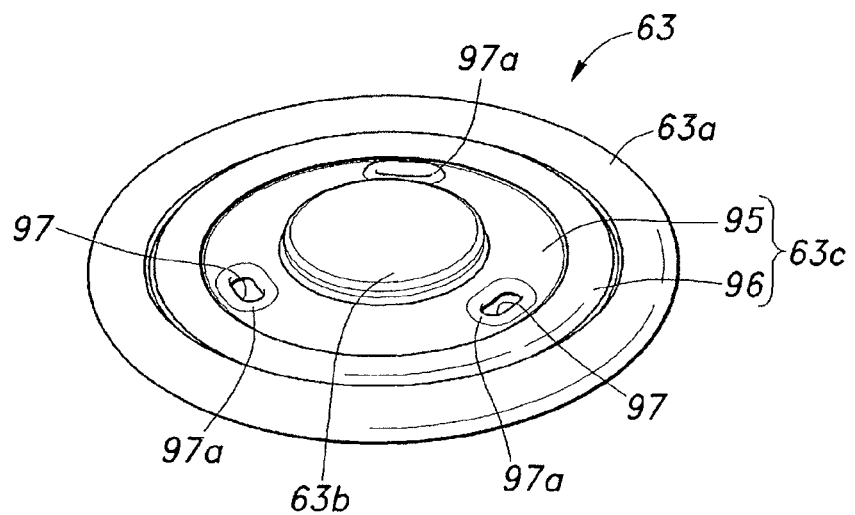
FIG. 4 is a perspective view viewed from an upper face side of a valve body of the fluid distribution valve according to the first embodiment.

A fitting portion 91, forming an outer circumferential edge provided to protrude downward in the flange-like portion 74, is fitted into an inside of a fitting portion 92 forming an outer circumferential edge provided to protrude upward in the flange-like portion 84. As also shown in FIG. 4, the film-like valve body 63 includes an annular outer circumferential portion 63*a* clamped between the flange-like portions 74 and 84 which are mutually connected; a thick and comparatively hard disk portion 63*b* provided approximately in the center; and an annular flexible portion 63*c* having a flexibility connecting the outer circumferential portion 63*a* and the disk portion 63*b*. The film-like valve body 63 is displaced in such a way as to divide the first branch pipe 73 from the second branch pipe 83 so as to be displaced or deformed according to a pressure difference of the washer fluid in a first branch pipe 73 side and a second branch pipe 83 side.

The flexible portion 63*c* is bent and deformed by the pressure of the washer fluid flowed into the inflow pipe 72, so that the disk portion 63*b* can be displaced in the axis direction (an approximately top-to-bottom direction in FIG. 3). Also, the flexible portion 63*c* includes a flat plate portion 95 on an inner circumferential side, and a curved portion 96 having a convex cross-sectional surface continuing into an outer circumferential side of the flat plate portion 95. In the flat plate portion 95, there is formed a plurality (in this case, three) of through holes 97 at equal intervals mutually in a circumferential direction. Furthermore, in a circumferential edge of the through holes 97, there are formed wall-thickness portions 97*a* having a circular cross-sectional surface, and protruding up and down the flexible portion 63*c*.

On an outer circumference of the second branch pipe 83, there is attached a compression spring 101 extending in the axis direction. In the compression spring 101, a lower end portion thereof abuts against an upper face of the lower wall of the main body portion 81, and an upper end portion thereof is fitted into a lower portion of the disk portion 63*b* of the film-like valve body 63. In this case, a diameter of the lower portion of the disk portion 63*b* is reduced to approximately become the same diameter of a coil diameter of the compression spring 101.

There, annular end edges 73*a* and 83*a* positioned inside the first and second branch pipes 73 and 83 respectively function as a valve seat corresponding to the film-like valve body 63. In the film-like valve body 63, as shown in FIG. 5(A), in an initial state thereof, an upper face of the disk portion 63*b* closely contacts with the end edge 73*a* and closes the first branch pipe 73. At that time, the disk portion 63*b* is urged upward (an end edge 73*a* side) by the compression spring 101 so as to be capable of reliably closing the first branch pipe 73. On the other hand, in the film-like valve body 63, when the pressure, (more precisely, the pressure difference of the washer fluid in the first branch pipe 73 side which becomes a high pressure side, and the second branch pipe 83 side which becomes a low pressure side) of the washer fluid flowed into the inflow pipe 72, exceeds a predetermined value, due to the aforementioned pressure (the pressure difference), the disk portion 63*b* is displaced downward against the compression spring 101. Thereby, as shown in FIG. 5(B), a lower face of the disk portion 63*b* closely contacts with the end edge 83*a*, and closes the second branch pipe 83. At that time, in all the through holes 97 of the film-like valve body 63, the wall-thickness portions 97a of the circumferential edge of the through holes 97 closely contact with an upper face 84a (a closed portion) of the flange-like portion 84, and are closed.

In the fluid distribution valve 10, there is formed an annular communicating channel 111 between a peripheral wall of the main body portion 71 and the first branch pipe 73 in the first split housing 61. Then, in a case wherein the first branch pipe 73 is closed, in a second distribution flow channel 114 defined by the communicating channel 111 and the second branch pipe 83, there generates a flow of the washer fluid as shown by an arrow E in FIG. 5(A). At that time, the washer fluid inflowing from a first split housing 61 side flows to a second split housing 62 side through each through hole 97 which is in an open state. Thus, by adequately setting a hole diameter and number of the through hole 97, a mechanism, which closes the first branch pipe 73, and also opens the second branch pipe 83, according to a size of the pressure of the washer fluid, can be realized by a further simplified flow channel structure.

Also, in the fluid distribution valve 10, in a case wherein the second branch pipe 83 and all the through holes 97 are closed, in a first distribution flow channel 112 defined by the communicating channel 111 and the first branch pipe 73, there generates a flow of the washer fluid as shown by an arrow F in FIG. 5(B). At that time, the aforementioned second distribution flow channel 114 is in a dually blocked state by not only the closing of the second branch pipe 83 but also by the closing of all the through holes 97. Incidentally, in an annular channel 113 formed between a peripheral wall of the main body portion 81 and the second branch pipe 83 in the second split housing 62, there is housed the compression spring 101.

By such a structure, in the fluid distribution valve 10, a mechanism, which closes either one of the two distribution flow channels 112 or 114, and also opens the other of the distribution flow channels 112 or 114, according to the size (i.e., an increase or decrease of a supply pressure of the washer fluid 5) of the pressure of the washer fluid supplied from the valve mechanism 8, can be easily realized. Incidentally, in this case, an example, in which the fluid distribution valve 10 is connected to the valve mechanism 8 through the plumbing 9, is shown. However, at least one portion (for example, the inflow pipe 72) of composition elements of the fluid distribution valve 10 can be integrally provided with the valve mechanism 8 (for example, the outflow pipe 37).

The pump control device 11 embeds an inverter circuit (not shown in the figures) composed of a microprocessor, a switching element, and the like; modifies a duty cycle regarding ON/OFF of an electric power supply of the electric motor 21 by a PWM (Pulse Width Modulation) system; and controls a rotating speed of the electric motor 21. By the pump control device 11, in the washer pump system 1, an adjustment of the pressure of the washer fluid guided to the first derivation flow channel 6 (i.e., a selection of closing or opening the first and second distribution flow channels 112 and 114) can be facilitated. Also, even in a case wherein a certain amount of power-supply voltage is supplied from the electric power supply, there also has the advantage that an electric voltage which is applied to the electric motor 21 can be easily adjusted by changing the duty cycle. Incidentally, an adjustment of the electric voltage which is applied to the electric motor 21 may be carried out by providing not only the aforementioned PWM control, but also, for example, a variable resistor between the electric motor 21 and the electric power supply. Also, in FIG. 2, although the pump control device 11 is placed along the washer pump 5, the pump control device 11 may be provided as a separate body from the washer pump 5.

Figure 6:
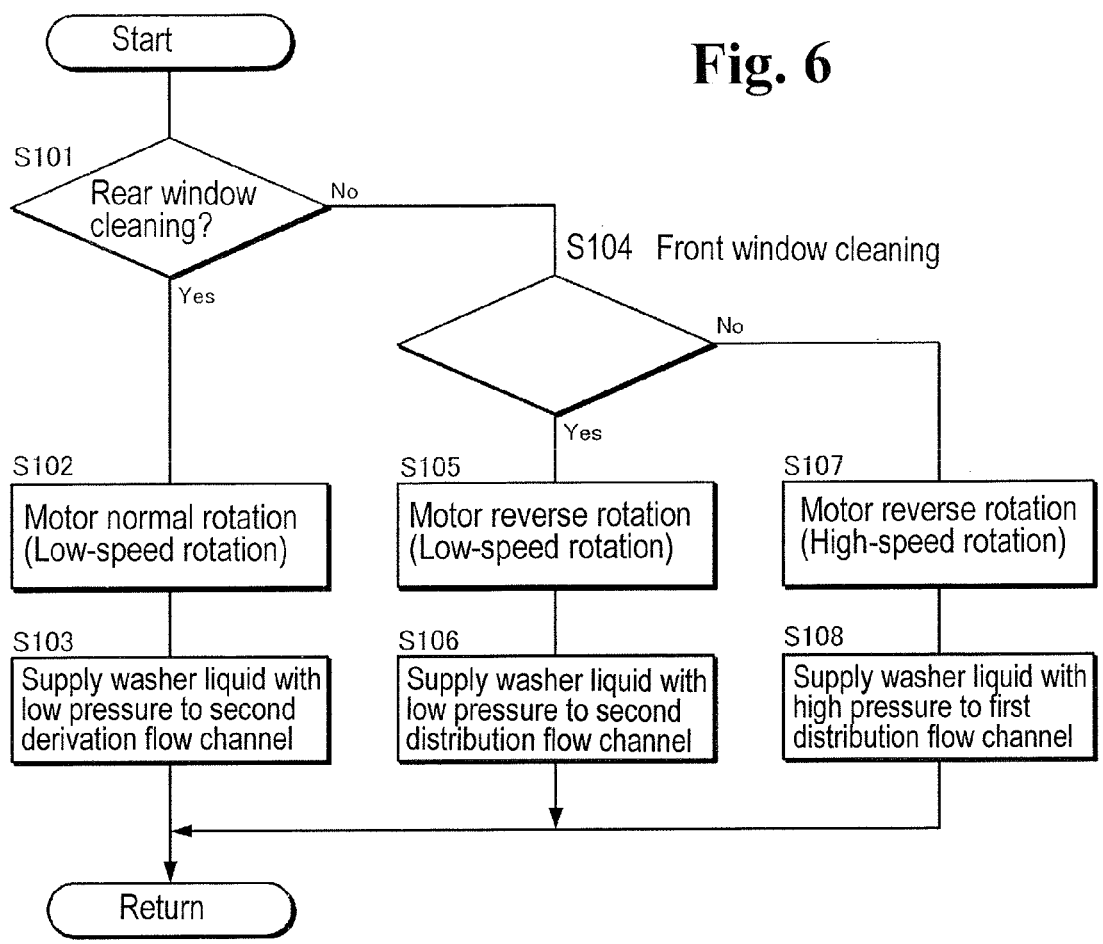
FIG. 6 is a flow diagram showing an operating procedure of a washer pump system according to the first embodiment.

Next, with reference to FIG. 6, a method for controlling the washer pump system 1 according to the first embodiment will be explained.

First, when an operator (in this case, a driver of the automobile) carries out a switch operation for supplying the washer fluid, the pump control device 11 determines to which of the rear window, the front window, or the headlamp an execution command generated according to the switch operation is given. In a case wherein the execution command is given to the rear window (S101: Yes), the pump control device 11 controls the electric motor 21 in such a way as to carry out a normal rotation (a rotation in an arrow A direction in FIG. 1) at a low speed (S102). At that time, as shown by the arrow D in FIG. 1, the washer fluid with a low pressure (for example, a pressure 150 kPa) is supplied toward the rear window through the second derivation flow channel V.

Also, in a case wherein the execution command is not given to the rear window (S101: No), and is given to the front window (S104: Yes), the pump control device 11 controls the electric motor 21 in such a way as to carry out a reverse rotation (a rotation in an arrow B direction in FIG. 1) at a low speed (S105). At that time, as shown by the arrow C in FIG. 1, the washer fluid with the low pressure (for example, the pressure 150 kPa) is supplied toward the fluid distribution valve 10 through the first derivation flow channel 6. At that time, in the fluid distribution valve 10, the pressure difference of the washer fluid in the first branch pipe 73 side and the second branch pipe 83 side does not exceed a predetermined value (a value necessary for displacing or deforming the film-like valve body 63), so that the first distribution flow channel 112 remains closed. Accordingly, as shown by the arrow E in FIG. 5(A), the washer fluid with the low pressure is supplied toward the front window through the second distribution flow channel 114.

Also, in a case wherein the execution command is not given to the rear window, nor the front window (S101: No, S104: No), the pump control device 11 controls the electric motor 21 in such a way as to carry out the reverse rotation (the rotation in the arrow B direction in FIG. 1) at a high speed (S107). At that time, as shown by the arrow D in FIG. 1, the washer fluid with a high pressure (for example, a pressure 200 kPa) is supplied toward the fluid distribution valve 10 through the first derivation flow channel 6. At that time, in the fluid distribution valve 10, the pressure difference of the washer fluid in the first branch pipe 73 side and the second branch pipe 83 side exceeds the predetermined value, so that the film-like valve body 63 is displaced or deformed, and the second distribution flow channel 114 is closed. Accordingly, as shown by the arrow F in FIG. 5(B), the washer fluid with the high pressure is supplied toward the headlamp through the first distribution flow channel 112. Incidentally, relative to the headlamp, mud and the like are required to be wiped off only by the pressure of the washer fluid, so that compared to the rear window or the front window, a cleaning by a high-pressure and large flow of washer fluid is effective.

In order to select the supply routes (the first distribution flow channel 112, and the second distribution flow channel 114) of the washer fluid, in place of a method wherein the pump control device 11 changes the supply pressure (150 kPa, or 200 kPa) of the supplying washer fluid as mentioned above, as shown in FIG. 7, a method for modifying a speed raising the supply pressure of the washer fluid up to the predetermined value (in this case, the pressure 200 kPa), may be used.

Figure 7:
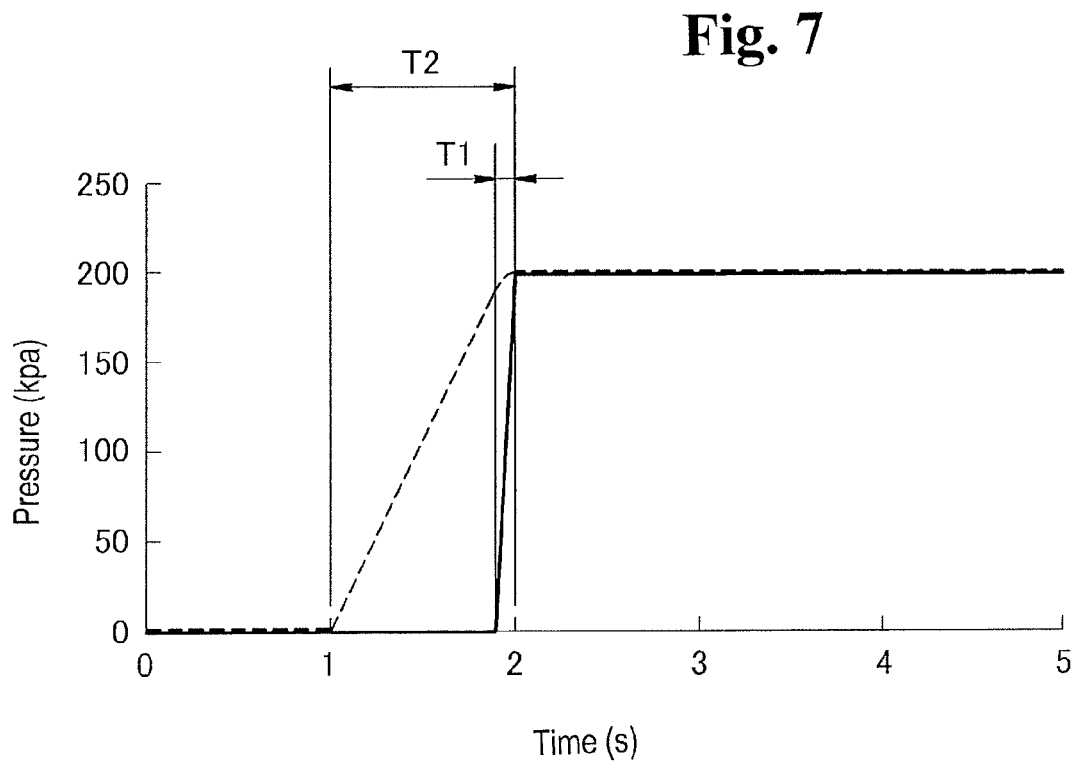
FIG. 7 is a graph showing one example of a time characteristic of a discharge pressure of the pump device related to a modified example of the operation of the washer pump system according to the first embodiment.

For example, when the washer pump 5 starts to supply the washer fluid, as shown by a solid line in FIG. 7, the pump control device 11 increases the supply pressure of the washer fluid up to the predetermined value (200 kPa) within a first time T1 (a split second), so that the film-like valve body 63 is displaced or deformed so as to be capable of opening the first distribution flow channel 112, and of closing the second distribution flow channel 114.

On the other hand, when the washer pump 5 starts to supply the washer fluid, less the pressure difference of the washer fluid in the first branch pipe 73 side and the second branch pipe 83 side exceeds the predetermined value (the value necessary for displacing or deforming the film-like valve body 63), as shown by a broken line in FIG. 7, the pump control device 11 gradually increases the supply pressure of the washer fluid up to the predetermined value (200 kPa) between a second time T2 (in this case, approximately 1 sec) which is larger than the first time T1 by the PWM control. Accordingly, even though a high supply pressure is eventually obtained, a closed state of the first distribution flow channel can be maintained.

Thus, even in a case wherein the supply pressure of the washer fluid by the washer pump 5 cannot increase and decrease in a necessary range, a rise of the supply pressure of the washer fluid is properly controlled, so that by a simplified structure, the washer fluid can be selectively supplied relative to two fluid supply routes (the first distribution flow channel 112, and the second distribution flow channel 114).

Thus, in the washer pump system 1 according to the first embodiment, there is provided the fluid distribution valve 10 operating according to the size of the pressure of the washer fluid together with the washer pump 5. Accordingly, in the simplified structure using one washer pump 5, by controlling the rotational direction of the impeller 2 and the rotational movement of the impeller 2 in one rotational direction, the washer fluid can be selectively supplied to three fluid supply routes (toward the rear window, the front window, and the headlamp). In the first embodiment, the fluid distribution valve 10 is a structure connected to a first outflow pipe 37 side. However, the fluid distribution valve 10 can be connected to a second outflow pipe 38 side. Also, by providing two fluid distribution valves respectively connected to both the first and second outflow pipes 37 and 38, the washer fluid can be selectively supplied to four fluid supply routes.

Incidentally, a usage of the aforementioned fluid distribution valve 10 is not limited to the washer pump system 1, and also can be applied to various fluid supply systems. Also, the distributed fluid by the fluid distribution valve 10 is not limited to the liquid, and may be a gas. Also, regarding a fluid supply source, not only the pump device but also a widely-known supply device can be arbitrarily used.

Figure 8:
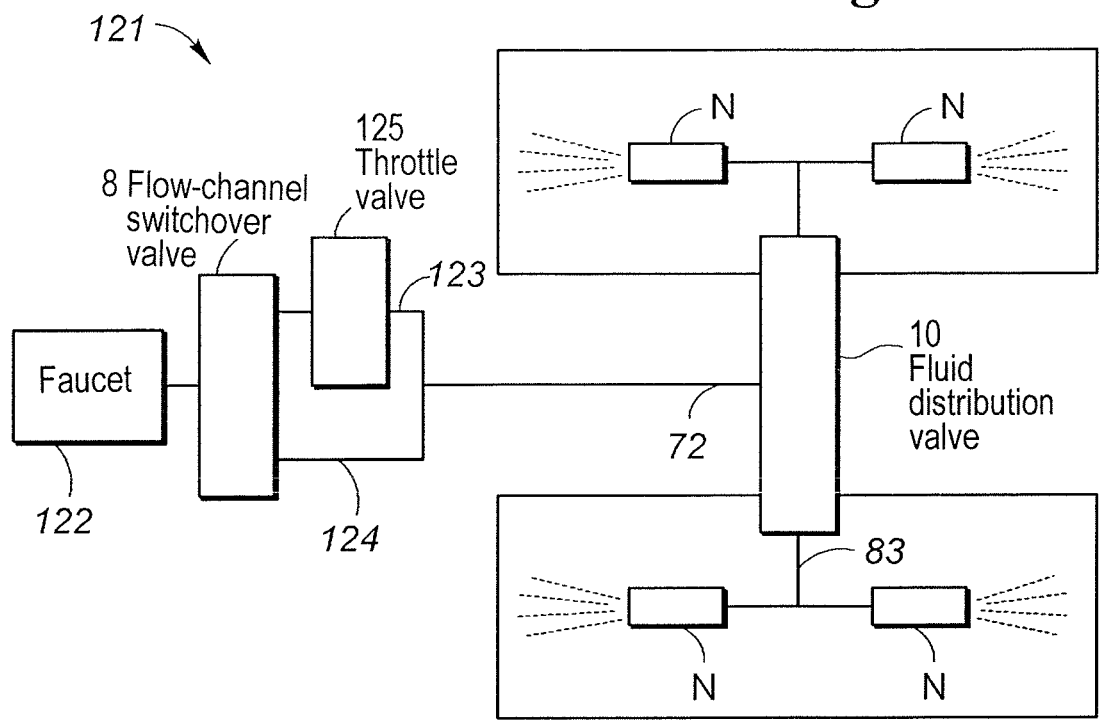
FIG. 8 is a structural view showing an example in which the fluid distribution valve according to the first embodiment is applied to another fluid supply system.

For example, as shown in FIG. 8, the fluid distribution valve 10 can be applied to a sprinkler system 121. The sprinkler system 121 comprises a faucet 122 as the fluid supply source; a flow-channel switchover valve (the valve mechanism) 8 provided on a downstream side thereof; first and second plumbing 123 and 124 defining a branch flow channel switched by the flow-channel switchover valve 8; and a throttle valve 125 provided in the first plumbing 123. In a joint portion of the first and second plumbing 123 and 124, there is connected the inflow pipe 72 of the fluid distribution valve 10. Also, in a downstream end of the first branch pipe 73 and the second branch pipe 83 of the fluid distribution valve 10, there are respectively attached two sprinkler nozzles N.

In the sprinkler system 121, the first plumbing 123, wherein the throttle valve 125 is provided, and the second plumbing 124 can be selected by the flow-channel switchover valve 8. In that case, by selecting the second plumbing 124, water can be selectively supplied to the first fluid supply route (which corresponds to the first branch pipe 73 side) through the fluid distribution valve 10. On the other hand, in a case of selecting the first plumbing 123, by adequately setting an opening angle of the throttle valve 125, as in the case of FIG. 7 (see the broken line), the pressure of the water flowing into the fluid distribution valve 10 can be gradually increased, and the water can be selectively supplied to the second fluid supply route (which corresponds to the second branch pipe 83 side) through the fluid distribution valve 10.

Figure 9:
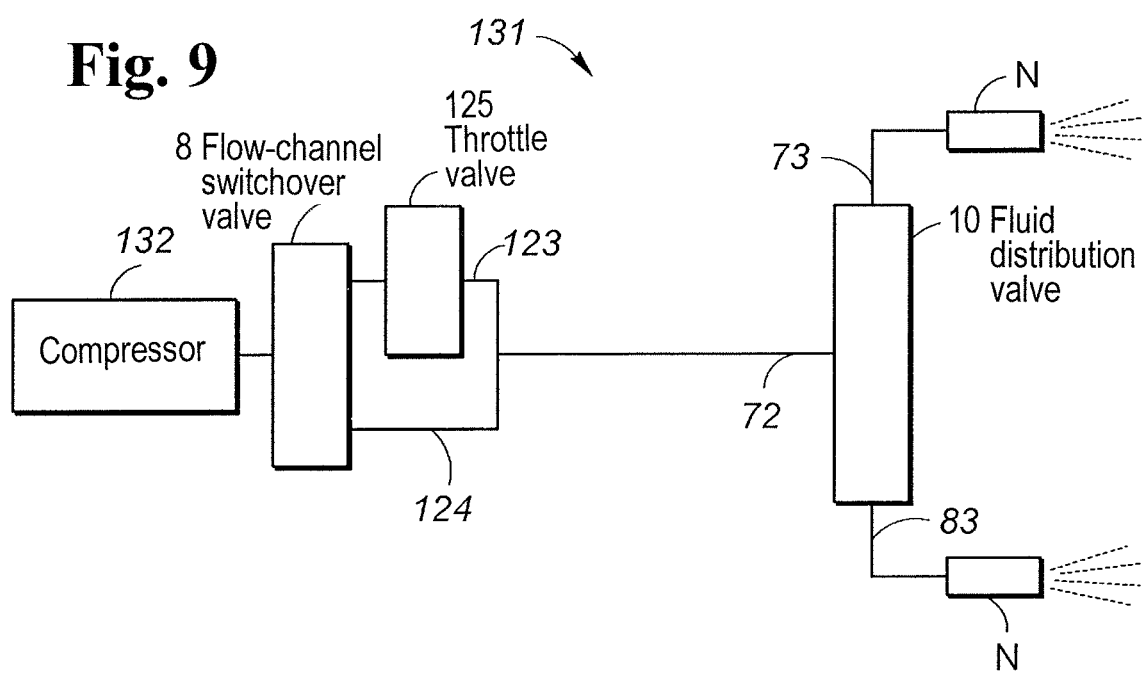
FIG. 9 is a structural view showing an example in which the fluid distribution valve according to the first embodiment is additionally applied to another fluid supply system.

Also, for example, as shown in FIG. 9, the fluid distribution valve 10 can be applied to an air blow system 131. The air blow system 131 has approximately the same structure as the sprinkler system 121 shown in FIG. 8 except for the point that air is supplied in place of the water using a compressor 132, and for the point that the air is sprayed using the air nozzles N. Even in the air blow system 131, the first plumbing 123, wherein the throttle valve 125 is provided, and the second plumbing 124 can be selected by the flow-channel switchover valve 8, and the air can be selectively supplied relative to the two fluid supply routes.

Second Embodiment

Next, with reference to FIGS. 10 to 15(B), the washer pump system according to a second embodiment of the present invention will be explained. In the second embodiment, except for matters specially described hereinafter, there includes the same structure as the washer pump system of the first embodiment. Also, in FIGS. 10 to 15(B), regarding the same composition elements as the first embodiment, the same symbols are assigned to the same composition elements as the first embodiment, and their explanations are omitted.

In the fluid distribution valve 10, the fitting portion 91, provided to protrude downward from a lower portion of the main body portion 71 of the first split housing 61, is fitted into the inside of the fitting portion 92 provided to protrude upward from an upper portion of the main body portion 81 of the second split housing 62. The outer circumferential portion 63a of the film-like valve body 63 is positioned inside the fitting portion 91, and is clamped between a lower face of the main body portion 71 of the first split housing 61, and an upper face of the main body portion 81 of the second split housing 62. A lower portion of the main body portion 81 of the second split housing 62 is open, and there are attached a cup-shaped elastic member 141, and a cup-shaped housing member 142 housing the elastic member 141 in such a way as to close an opening of the lower portion thereof. The center of the elastic member 141 is positioned on a central axis of the first branch pipe 73.

Figure 11:
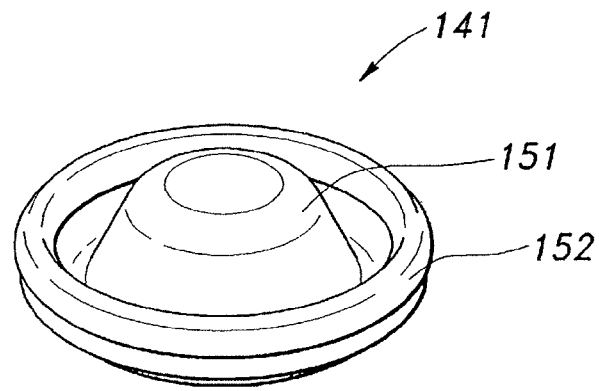
FIG. 11 is a perspective view of a cup-shaped member of the fluid distribution valve according to the second embodiment.

The elastic member 141 is made of a rubber member which can be easily deformed, and as also shown in FIG. 11, the elastic member 141 includes a bottom portion 151 having an end-rounded conical shape or a rotated paraboloidal shape; and an annular opening edge portion 152 continuing into the bottom portion 151. An initial state is a state wherein the bottom portion 151 is folded back inside the opening edge portion 152.

Figure 10:
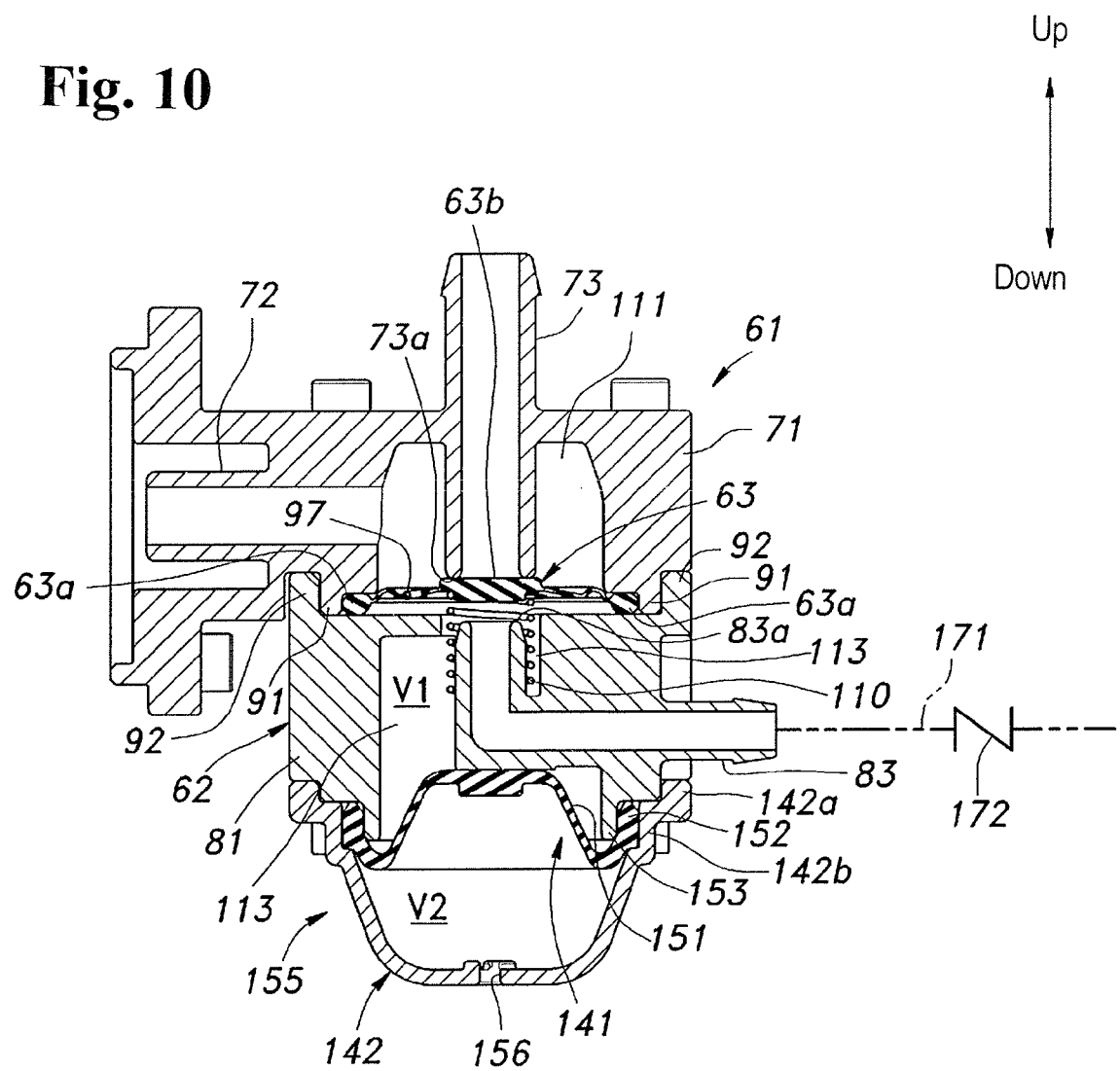
FIG. 10 is a cross-sectional view of the fluid distribution valve according to a second embodiment.

As shown in FIG. 10, in an opening edge portion 142a of the housing member 142, there is fitted the lower portion of the main body portion 81 of the second split housing 62. Also, there is clamped the opening edge portion 152 of the elastic member 141 between an inner circumferential face of an annular fixed portion 142b continuing into a lower side of the opening edge portion 142a in the housing member 142; and an outer circumferential face of a fitting portion 153 provided to protrude downward from the lower portion of the main body portion 81 of the second split housing 62.

Figure 12:
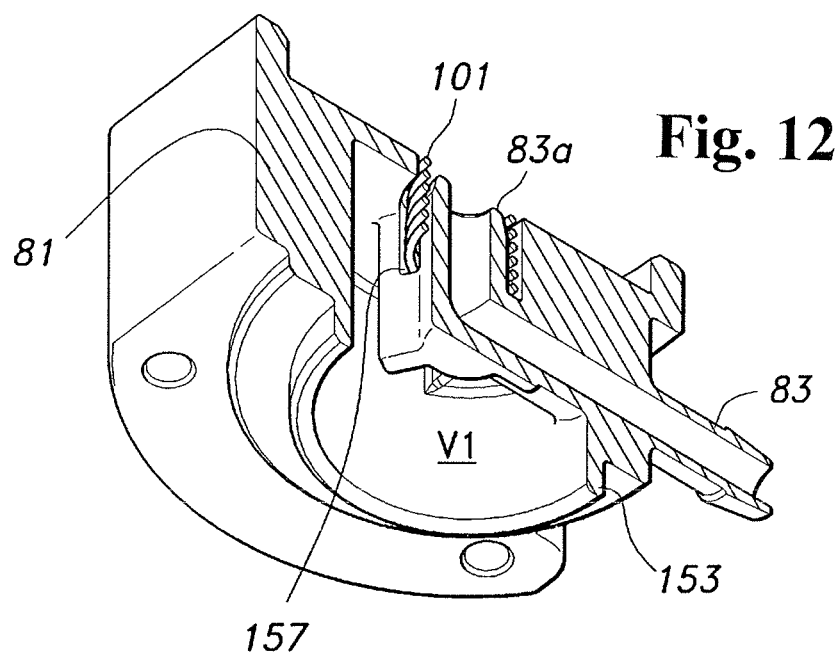
FIG. 12 is a cross-sectional perspective view of essential parts of the fluid distribution valve according to the second embodiment.

In the fluid distribution valve 10 having the aforementioned structure, there is formed an accumulator 155 wherein a space, defined by the main body portion 81 (the annular channel 113) of the second split housing 62 and the elastic member 141, is a storage space V1. As shown in FIG. 12, the storage space V1 is communicated with the annular channel 113 wherein the compression spring 101 is housed through an opening 157. Also, in a case wherein the first branch pipe 73 is in a closed state, the storage space V1 is communicated with the second branch pipe 83, and is communicated with an inflow pipe 72 side (i.e., the washer pump 5) through the through holes 97 of the film-like valve body 63 which is in the open state. Also, in the bottom portion of the housing member 142, there is provided a communicating hole 156. Thereby, a buffer space V2 defined between the elastic member 141 and the housing member 142 is communicated with an outside.

Also, as shown in FIG. 10, in plumbing 171 on a downstream side communicated with the second branch pipe 83, there is provided a check valve 172 for preventing leakage of the washer fluid from a nozzle (not shown in the figures) for the front window provided on the downstream end thereof at a time of non-use. Incidentally, in this case, although the check valve 172 is used, other well-known flow-channel opening-closing devices can also be used provided that they include a structure capable of opening a flow channel (the plumbing 171) by the pressure of the fluid with the predetermined value or more in order to prevent the leakage of the washer fluid at least at the time of non-use.

Figure 13A:
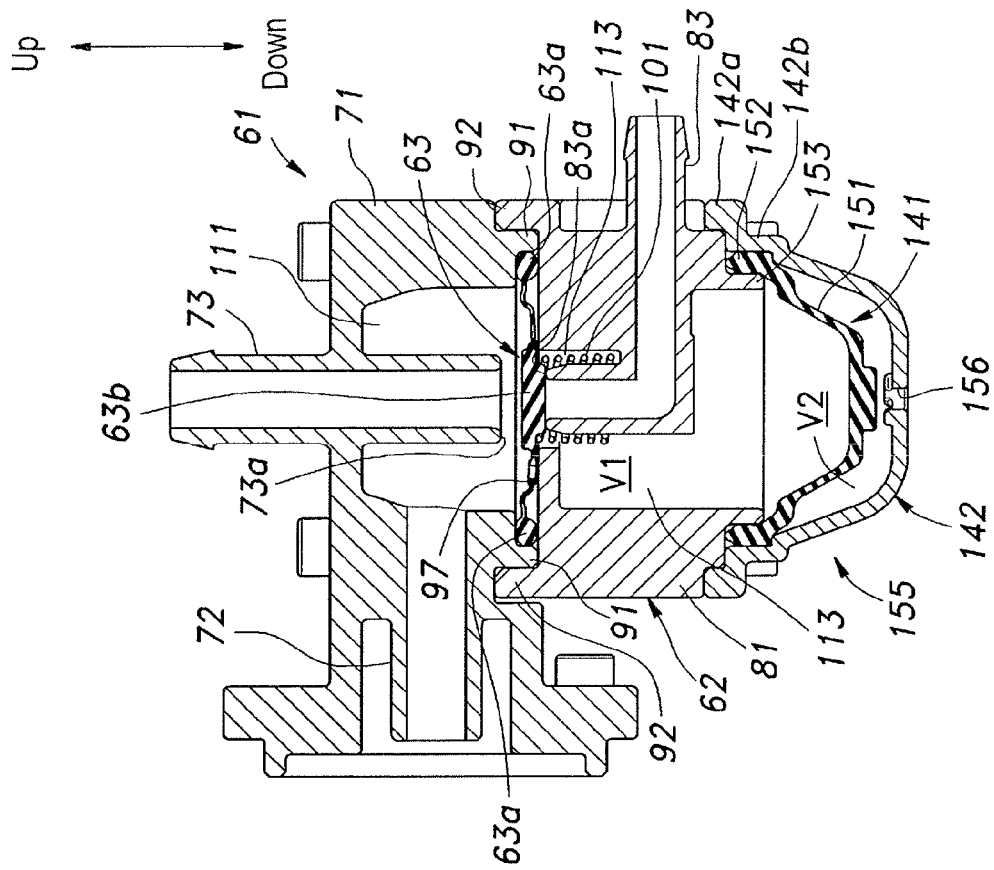
FIGS. 13(A) and 13(B) are cross-sectional views showing an operation of an accumulator in the fluid distribution valve according to the second embodiment.

Next, with reference to FIGS. 13(A) and 13(B), an operation of the accumulator 155 in the fluid distribution valve 10 according to the second embodiment will be explained.

In the fluid distribution valve 10, when the washer fluid with the low pressure (for example, the pressure 150 kPa) is supplied from the inflow pipe 72, the pressure difference of the washer fluid in the first branch pipe 73 side and the second branch pipe 83 side does not exceed the predetermined value (the value necessary for displacing or deforming the film-like valve body 63). Accordingly, as shown in FIG. 13(A), the first branch pipe 73 remains closed as in the case of the initial state shown in FIG. 10. Thereby, the washer fluid flowed from the inflow pipe 72 flows inside the second branch pipe 83 of the second split housing 62 through each through hole 97 which is in the open state. At that time, in the accumulator 155, by the fluid passed through the through hole 97, there generates a pressure necessary for resolving a folded state of the elastic member 141 in the storage space V1. From the initial state shown in FIG. 10, the elastic member 141 elastically deforms so as to resolve the folded state thereof. In that case, the pressure necessary for resolving the folded state of the elastic member 141 may be set in an opening valve pressure of the check valve 172 or less.

Incidentally, when a supply of the washer fluid is halted, and the pressure in the storage space V1 declines again, the aforementioned elastic member 141 returns to the initial state (the folded state) shown in FIG. 10 again by a restoring force. At that time, the washer fluid inside the reduced storage space V1 is sent to a washer pump 5 (see FIG. 1) side wherein atmosphere is opened through each through hole 97 in such a way as to flow back.

On the other hand, when the washer fluid with the high pressure (for example, the pressure 200 kPa) is supplied from the inflow pipe 72, the pressure difference of the washer fluid in the first branch pipe 73 side and the second branch pipe 83 side exceeds the predetermined value. Accordingly, as shown in FIG. 13(B), the film-like valve body 63 is displaced or deformed, the through hole 97 is closed, and the second branch pipe 83 is closed. At that time, in the accumulator 155, by the fluid passed through the through hole 97 until the through hole 97 is closed, there generates the pressure necessary for resolving the folded state of the elastic member 141 in the storage space V1. From the initial state shown in FIG. 10, the elastic member 141 elastically deforms so as to resolve the folded state thereof. As a result, as shown in FIG. 13(B), the storage space V1 is expanded so as to be capable of preventing an inflow of an unintended fluid to the second branch pipe 83.

Figure 13B:
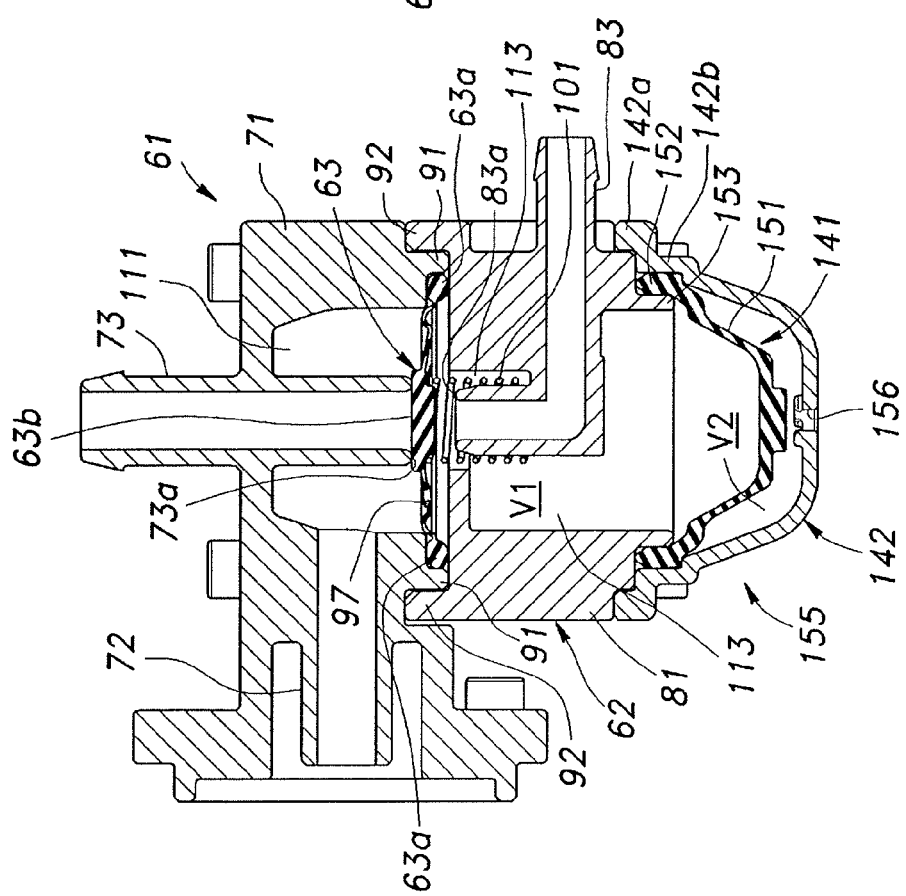
Figure 14:
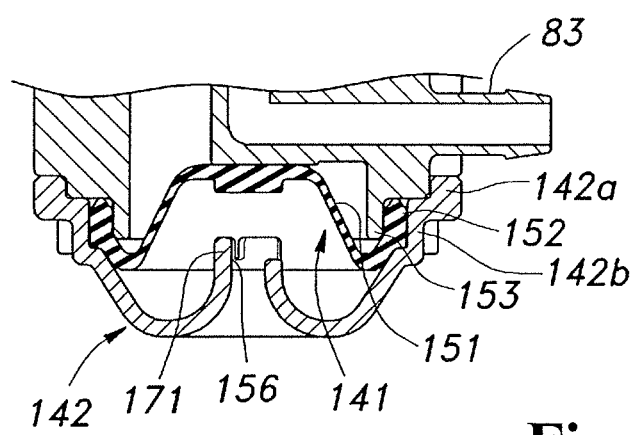
FIG. 14 is a cross-sectional view of essential parts showing a modified example of the accumulator according to the second embodiment.

In that case, the folded state of the elastic member 141 does not necessarily need to be completely resolved as shown in FIG. 13(B), and only the storage space V1 needs to be expanded to a preventable extent of the inflow of the fluid to at least the second branch pipe 83. Also, the accumulator 155 is provided in the lower portion of the main body portion 81 of the second split housing 62 so as to have the advantage that the folded state of the elastic member 141 can be easily resolved relative to a change of the pressure of the storage space V1.

In order to facilitate and ensure a restoration to the initial state of the elastic member 141 as mentioned above, for example, as shown in FIG. 14, in the housing member 142, there can be provided a protruding portion 171 protruded toward the elastic member 141 in such a way as to fold back the bottom portion thereof. Namely, the protruding portion 171 abuts against the bottom portion 151 of the elastic member, so that a downward displacement of the bottom portion 151 is restricted within a predetermined range (i.e., the folded state of the elastic member 141 is not completely resolved) so as to facilitate the restoration of the elastic member 141.

Figure 15A:
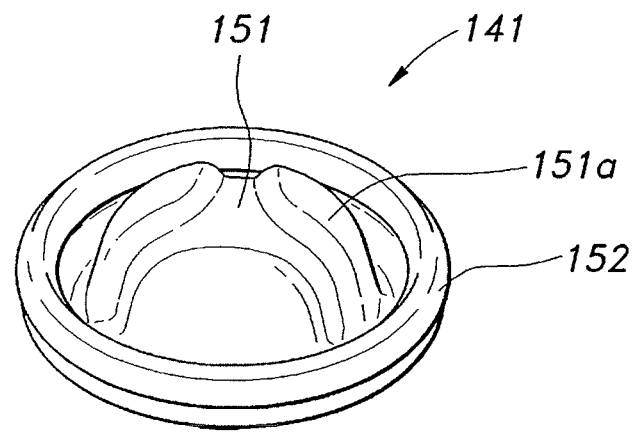
FIG. 15(A) is a perspective view and FIG. 15(B) is a partially broken perspective view, showing a modified example of an elastic member according to the second embodiment.
Figure 15B:
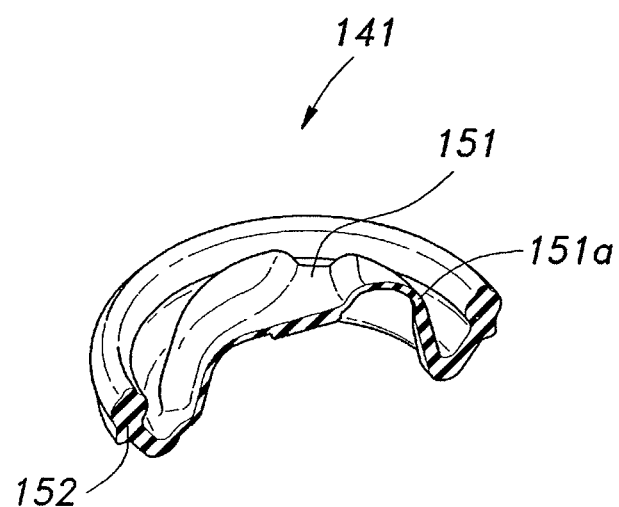

Also, a shape of the elastic member 141 can be variously modified, and for example, as shown in FIGS. 15(A) and 15(B), there is formed a plurality (in this case, three) of elevated portions 151a in the bottom portion 151 so as to be capable of increasing the restoring force to the initial state of the elastic member 141.

Third Embodiment

Figure 16:
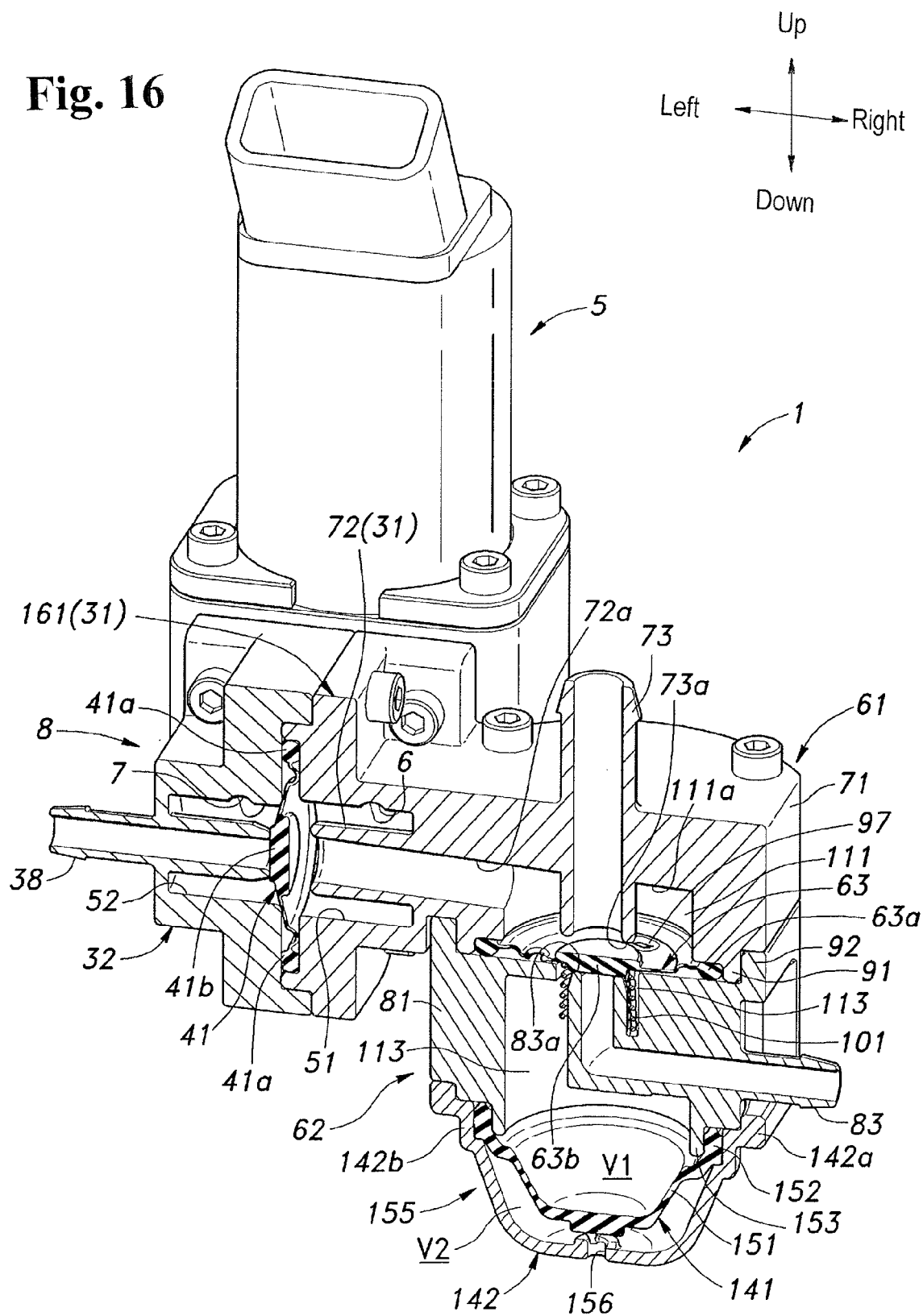
FIG. 16 is a cross-sectional perspective view of the washer pump system comprising the fluid distribution valve according to a third embodiment.

Next, with reference to FIG. 16, the washer pump system 1 according to a third embodiment of the present invention will be explained. In the third embodiment, except for matters specially described hereinafter, there includes the same structure (including the structure of the first embodiment wherein the explanation regarding the second embodiment is omitted) as the washer pump system of the second embodiment. Also, in FIG. 16, regarding the same composition elements as the second embodiment, the same symbols are assigned to the same composition elements as the second embodiment, and their explanations are omitted.

In the fluid distribution valve 10, a flange portion 161 is fastened to the second split housing 32 of the valve mechanism 8 by a bolt so as to function in the same manner as the first split housing 31 in the first embodiment. Also, the inflow pipe 72 functions in the same manner as the first outflow pipe 37 in the first split housing 31. Thereby, the fluid distribution valve 10 is integrally provided with the valve mechanism 8, and the plumbing 9 (see FIG. 1) is omitted.

In the fluid distribution valve 10, a flow channel 72a of the inflow pipe 72 is provided to incline in such a way that a washer pump 5 side becomes higher relative to a horizontal direction (the right-and-left direction). Also, an upper wall 111a of the communicating channel 111 in the first split housing 61 is connected to a downstream side of an upper edge of the flow channel 72a in the inflow pipe 72, and inclines in such a way that the washer pump 5 side becomes higher. By such a structure, even in a case wherein air is mixed into the fluid distribution valve 10, the air is discharged into the washer pump 5 side through the inflow pipe 72 from the communicating channel 111. Moreover, in the washer pump 5 side, the first and second derivation flow channels 6 and 7 are open in the uppermost portion of the communicating channels 51 and 52, so that the air discharged from the inflow pipe 72 is sent to a storage tank (not shown in the figures) of the washer fluid through the first and second derivation flow channels 6 and 7.

Thus, the washer pump system 1 according to the third embodiment has a structure which does not allow the air to remain inside the flow channel of the washer fluid so as to be capable of preventing a decline or a destabilization of the pressure of the washer fluid.

Although the present invention has been explained in detail based on specific embodiments, the aforementioned embodiments are shown just as an example, and the present invention is not limited to the aforementioned embodiments. For example, the washer pump system and a method for controlling the washer pump system according to the present invention can be used for a usage for selectively supplying the washer fluid not only to the rear window, the front window, and the headlamp as mentioned above, but also to three or four arbitrary fluid supply routes.

EXPLANATION OF SYMBOLS

1 a washer pump system (a fluid supply system)
2 an impeller
3 a first discharge pipe (a discharge opening)
4 a second discharge pipe (a discharge opening)
5 a washer pump (a pump device, a fluid supply source)
6 a first derivation flow channel
7 a second derivation flow channel
8 a valve mechanism
10 a fluid distribution valve
11 a pump control device
21 an electric motor
35 a first inflow pipe
36 a second inflow pipe
37 a first outflow pipe
38 a second outflow pipe
63 a film-like valve body
63a an outer circumferential portion
63b a disk portion
63c a flexible portion
72 an inflow pipe
73 a first branch pipe
83 a second branch pipe
97 a through hole
101 a compression spring (an urging device)
112 a first distribution flow channel
114 a second distribution flow channel
141 an elastic member
151 a bottom portion
152 an opening edge portion
155 an accumulator
V1 a storage space

What is claimed is:

1. A fluid distribution valve which selectively distributes a fluid supplied from a fluid supply source to a plurality of flow channels, comprising:
   first and second branch pipes communicating with the fluid supply source; and
   a valve body selectively closing either one of the two branch pipes, and including a through hole allowing a circulation of the fluid into the second branch pipe from the fluid supply source in a case wherein the first branch pipe is closed,
   wherein while the valve body closes the first branch pipe in an initial state thereof, the valve body is displaced or deformed according to a pressure difference of the fluid in a first branch pipe side and a second branch pipe side when the fluid is supplied from the fluid supply source, to thereby open the first branch pipe, and to close the through hole.

2. A fluid distribution valve according to claim 1, further comprising an urging device urging a main body portion in a direction of closing the first branch pipe.

3. A fluid distribution valve according to claim 1, further comprising an accumulator having a storage space communicating with the fluid supply source through the through hole in a case wherein the first branch pipe is in a closed state, and
   wherein the storage space is expanded by a pressure of the fluid when the fluid is supplied from the fluid supply source.

4. A fluid distribution valve according to claim 3, wherein the accumulator includes a cup-shaped elastic member defining one portion of the storage space;
   the elastic member includes a bottom portion having an end-rounded conical shape, and an annular opening edge portion continuing into the bottom portion; and
   while the bottom portion is in a state folded back inside the opening edge portion in an initial state of the elastic member, the state folded back is resolved by a pressure of the fluid when the fluid is supplied from the fluid supply source.

5. A method for controlling the fluid supply system comprising the fluid distribution valve according to claim 1,
   wherein the fluid supply system includes first and second pipes provided as a branch flow channel in the flow channels connecting the fluid supply source and the fluid distribution valve; a throttle valve provided in the first pipe; and a flow-channel switchover valve provided on an upstream side of the first and second pipes, and selectively circulating the fluid from the fluid supply source to the first or second pipes,
   the method comprising, in a case wherein the fluid is circulated to the second plumbing by the flow-channel switchover valve, a step of opening the first branch pipe and closing the through hole; and in a case wherein the fluid is circulated to the first pipe by the flow-channel switchover valve, a step of maintaining the closed state of the first branch pipe by gradually increasing a pressure of the fluid supplied to the fluid distribution valve by the throttle valve.

* * * * *